(12) United States Patent
Boll

(10) Patent No.: US 6,286,993 B1
(45) Date of Patent: Sep. 11, 2001

(54) METHOD FOR FORMING A SIGNAL REPRESENTING THE INSTANTANEOUS TEMPERATURE OF A CATALYTIC CONVERTER

(75) Inventor: Wolf Boll, Weinstadt (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/369,080

(22) Filed: Aug. 5, 1999

(30) Foreign Application Priority Data

Aug. 7, 1998 (DE) .............................................. 198 35 748

(51) Int. Cl.$^7$ ................................................... G01K 13/00
(52) U.S. Cl. ............................ 374/144; 374/142; 374/135
(58) Field of Search ...................... 374/166, 145, 374/144, 142, 141, 135, 101; 73/118.1, 23.31, 23.32; 60/174, 277

(56) References Cited

U.S. PATENT DOCUMENTS

| | | |
|---|---|---|
| 4,656,829 | 4/1987 | Creps et al. . |
| 4,770,543 * | 9/1988 | Burghoff et al. ..................... 374/142 |
| 5,400,592 * | 3/1995 | Mukaihira et al. .................... 60/274 |
| 5,414,994 * | 5/1995 | Cullen et al. .......................... 60/274 |
| 5,544,482 * | 8/1996 | Matsumoto et al. .................. 60/279 |
| 5,566,546 * | 10/1996 | Rumpsa et al. ....................... 60/274 |
| 5,584,176 * | 12/1996 | Meyer et al. ......................... 60/274 |
| 5,600,947 | 2/1997 | Cullen . |
| 5,606,855 * | 3/1997 | Tomisawa .............................. 60/274 |
| 5,622,049 * | 4/1997 | Kitamura et al. ..................... 60/285 |
| 5,647,668 * | 7/1997 | Schnaibel et al. .................... 374/144 |
| 5,729,971 | 3/1998 | Matsuno et al. . |
| 5,787,705 * | 8/1998 | Thoreson ............................... 60/274 |
| 5,815,828 * | 9/1998 | Nankee, II et al. .................. 701/109 |
| 5,877,413 * | 3/1999 | Hamburg et al. .................... 73/118.1 |
| 5,953,905 * | 9/1999 | Jerger et al. .......................... 60/274 |

FOREIGN PATENT DOCUMENTS

| | | |
|---|---|---|
| 42 11 092 | 10/1993 | (DE) . |
| 42 34 420 | 4/1994 | (DE) . |
| 692 00 423 | 2/1995 | (DE) . |
| 43 38 342 | 5/1995 | (DE) . |
| 44 10 225 | 9/1995 | (DE) . |
| 196 43 674 | 4/1997 | (DE) . |
| 196 45 577 | 5/1997 | (DE) . |
| 197 39 751 | 3/1998 | (DE) . |
| 197 20 209 | 6/1998 | (DE) . |
| 0 626 507 | 11/1994 | (EP) . |
| 0 667 446 | 8/1995 | (EP) . |
| 0089482 * | 8/1978 | (JP) ..................................... 374/144 |
| 404181149 * | 6/1992 | (JP) ..................................... 73/23.32 |

* cited by examiner

Primary Examiner—Diego Gutierrez
Assistant Examiner—L. De Jesús
(74) Attorney, Agent, or Firm—Kenyon & Kenyon

(57) ABSTRACT

A method for forming a signal in a device having an internal combustion engine and an associated catalytic converter, the signal representing the instantaneous temperature of the catalytic converter. The internal combustion engine is controllable by an electronic engine control unit as a function of the load, the engine speed and other operating parameters. Air may be supplied to the internal combustion engine via an intake port, whereas the exhaust gases from the internal combustion engine may be carried away via an exhaust duct in which a catalytic converter is arranged. The internal combustion engine may be cooled by a radiator having a coolant circulation. The coolant temperature, the outside air temperature, the load and the engine speed are detected by sensors and corresponding signals are supplied to an electronic control unit. The electronic control unit ascertains the exhaust-gas flow and the exhaust-gas temperature over time by calculation from the load and the engine speed. The electronic control unit ascertains the instantaneous temperature of the catalytic converter by calculation from the detected and ascertained parameters, as well as from a starting value of the catalytic-converter temperature stored in the electronic control unit.

4 Claims, 1 Drawing Sheet

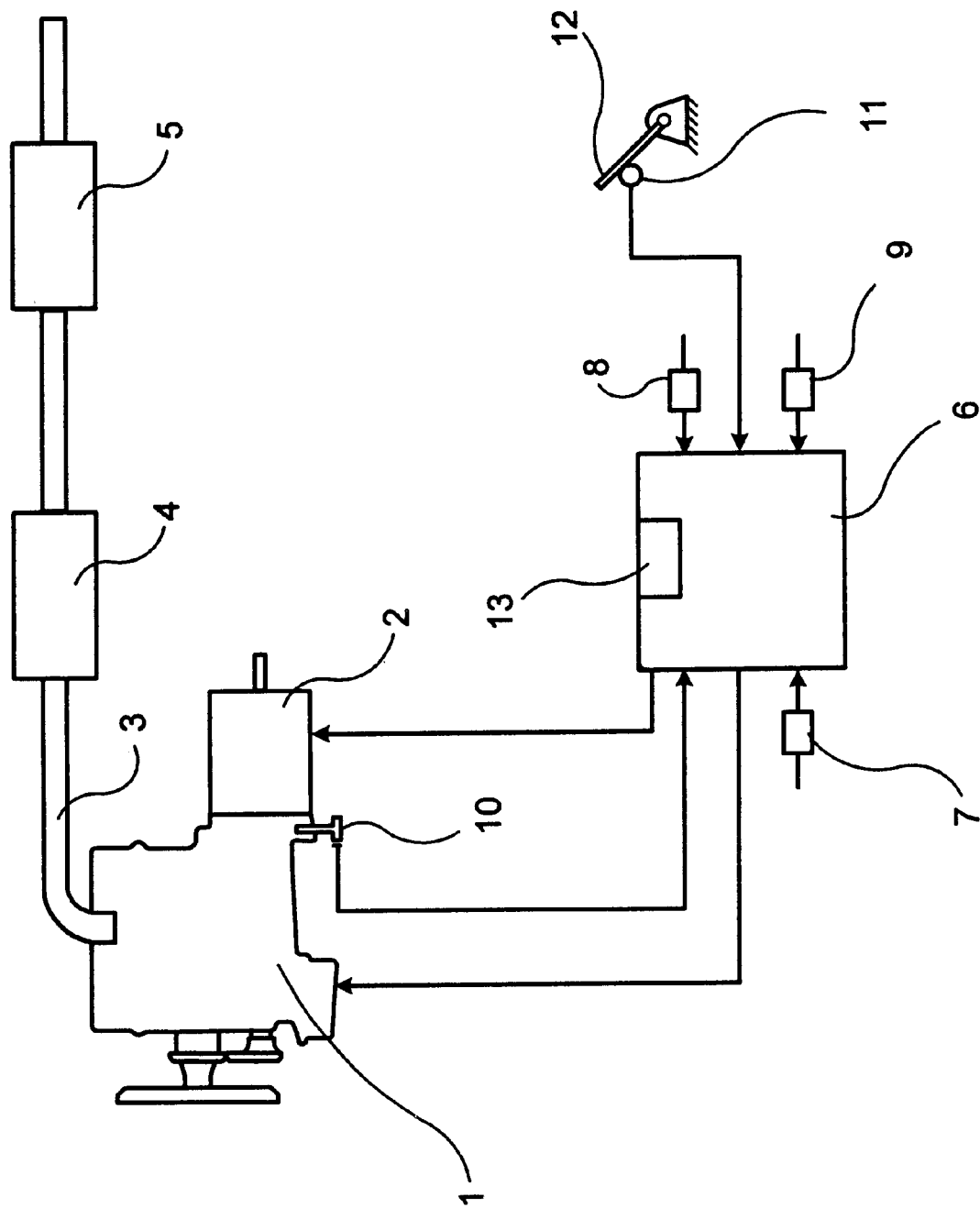

METHOD FOR FORMING A SIGNAL REPRESENTING THE INSTANTANEOUS TEMPERATURE OF A CATALYTIC CONVERTER

FIELD OF THE INVENTION

The present invention relates to a method for forming a signal in a device having an internal combustion engine and an associated catalytic converter, the signal representing the instantaneous temperature of the catalytic converter.

Internal combustion engines emit by far the greatest portion of pollutants during a cold start. Various methods are known for reducing emissions and for shortening the warm-up time. In so doing, early reaching of the "light-off temperature" of the catalytic converter is of primary importance.

Open-loop control of the entire process with respect to the engine, including cold-start enrichment, air injection into the exhaust manifold and boosted exhaust-gas recirculation, an idling speed increase, as well as possible further measures in the exhaust train, is best carried out taking into consideration the actual instantaneous temperature of the catalytic converter. Such further measures could be an interconnection of primary catalytic converters, using a heatable catalytic converter, using a hydrocarbon trap, effecting a reversal of the flow-through direction of muffler and catalytic converter, as well as increasing the back pressure using a choke.

The use of sensors to measure the temperature of the catalytic converter requires undue effort and is costly, and the known sensors do not have an adequate service life.

German Patent Application No. 43 38 342 A1 describes a method in which the operating parameters of the air mass supplied in the intake port, of the opening angle of the throttle valve, of the temperature of the internal combustion engine, of the speed of the internal combustion engine, of a first exhaust-gas value upstream of the catalytic converter, as well as of a second exhaust-gas value downstream of the catalytic converter, are supplied to a central control unit for the simulation of the instantaneous temperature of the catalytic converter which is formed from these operating parameters. This method calls for a great number of sensors, and is therefore costly and requires too much effort.

SUMMARY OF THE INVENTION

An object of the present invention is to provide a method which makes it possible to easily and reliably ascertain the respective actual temperature of the catalytic converter during the normal operation of a motor vehicle, particularly during the warm-up phase of the internal combustion engine.

The present invention provides a method for forming a signal representing an instantaneous temperature of a catalytic converter in a device having an internal combustion engine, the engine being controllable using an electronic engine control unit as a function of at least a load and an engine speed, the engine being capable of being cooled by a radiator having a coolant circulation path, the engine being capable of being supplied with air via an intake port, the engine being capable of having exhaust gases carried away via an exhaust duct, a catalytic converter being disposed in the exhaust duct, the method comprising: detecting a coolant temperature, an outside air temperature, the load and the engine speed using associated sensors; supplying corresponding signals from the sensors to an electronic control device; determining, using the electronic control device, an exhaust-gas flow rate and an exhaust-gas temperature over time by calculation based on the load and the engine speed, or from at least one first characteristics map stored in a first memory of the electronic control device; and determining, using the electronic control device, the instantaneous temperature of the catalytic converter by calculation based on a catalytic converter starting temperature value stored in the electronic control device and at least one of the detected coolant temperature, the detected outside air temperature, the detected load, the detected engine speed, the determined exhaust-gas flow rate and the determined exhaust-gas temperature, or from at least one second characteristics map stored in a second memory of the electronic control device.

A method according to the present invention requires only a few simple sensors having a long service life, thus permitting a simple and cost-effective design of the device necessary for this purpose. Since, using this method, the actual instantaneous temperature of the catalytic converter is ascertained quickly and supplied to the engine-management electronics, it is possible to markedly reduce the emissions from the internal combustion engine, particularly during the warm-up phase of the internal combustion engine and of the catalytic converter.

A method according to the present invention not only reduces emissions during daily travel operation, but also reduces fuel consumption, since the warm-up procedures are carried out only until the catalytic converter has reached its starting temperature. Thus, the engine warm-up program can be optimized in a manner in which only true running and load assumption must be ensured. Moreover, fuel consumption is minimized because the idling speed of the engine, and possibly the shifting speeds in the case of automatic transmission, are reduced. The previous cold-running shifting jolt is avoided.

Depending on the operational situation, mixture enrichment as well as the air injection into the exhaust manifold, which lead to a stress of the vehicle electrical system during a winter cold start, are also considerably reduced.

To form the starting value of the catalytic converter temperature in a simple manner, after the internal combustion engine has been switched off, ascertainment of the instantaneous catalytic converter temperature can be continued until the ascertained instantaneous catalytic converter temperature corresponds approximately to the detected ambient temperature. This can be stored as a new starting value of the catalytic converter temperature in the electronic control unit.

To permit a small, simple design and to avoid electromagnetic disturbances of the signal of the instantaneous catalytic converter temperature supplied by the electronic control unit to an electronic engine control unit, the electronic control unit can be a part of the electronic engine control unit. The size of the load is detected in a simple way by an opening-angle sensor of a throttle valve in the intake port, or by a position sensor of a gas pedal.

BRIEF DESCRIPTION OF THE DRAWINGS

An exemplary embodiment of the present invention is described more precisely in the following and is shown in the drawing, in which:

The single FIGURE shows a block diagram of a device with an internal combustion engine which is controllable by an electronic engine control unit.

DETAILED DESCRIPTION

The device shown has an internal combustion engine 1 for a motor vehicle, on which an automatic transmission 2 is arranged. The exhaust gas from internal combustion engine 1 is carried away via an exhaust duct 3, in which a catalytic converter 4 and a muffler 5 are arranged one after the other in the direction of flow. For the closed-loop control of internal combustion engine 1 and of automatic transmission 2, provision is made for an electronic engine control unit 6 which receives information from sensors 7 through 10 about operating parameters of the vehicle, one sensor being an engine speed sensor 10.

A further sensor is an engine-coolant temperature sensor 7 which detects the respective temperature of the coolant of an engine radiator (not shown). Sensor 8 is an outside-air temperature sensor 8. Electronic engine control unit 6 also receives a signal from a position sensor 11 of a gas pedal 12, the signal being a function of the position of gas pedal 12.

Electronic engine control unit 6 generates control signals for internal combustion engine 1 and automatic transmission 2, controls the operation of internal combustion engine 1, and drives the automatic transmission as a function of the measured values acquired by sensors 7 through 10 and the position of gas pedal 12.

Arranged in a manner that it is integrated into electronic engine control unit 6 is an electronic control unit 13 which likewise receives the signals from sensors 7 through 11, and whose output signal is a signal, formed in electronic control unit 13, representing the instantaneous temperature of the catalytic converter, the signal being supplied to electronic engine control unit 6 as a further signal for controlling the operation of the internal combustion engine in closed loop.

In the event that very precise catalytic-converter temperatures are needed, provision can be made in the region which is less thermally loaded, e.g., downstream of the muffler, for a temperature measuring point (not shown in the FIGURE) which is able to supply an adjusting signal to control unit 13 that permits further conclusions by calculation about the actual temperature of the catalytic converter.

What is claimed is:

1. A method for forming a signal representing an instantaneous temperature of a catalytic converter in a device having an internal combustion engine, the engine being controllable using an electronic engine control unit as a function of at least a load and an engine speed, the engine being capable of being cooled by a radiator having a coolant circulation path, the engine being capable of being supplied with air via an intake port, the engine being capable of having exhaust gases carried away via an exhaust duct, a catalytic converter being disposed in the exhaust duct, the method comprising:

detecting a coolant temperature, an outside air temperature, the load and the engine speed using associated sensors;

supplying corresponding signals from the sensors to an electronic control device;

determining, using the electronic control device, an exhaust-gas flow rate and an exhaust-gas temperature over time by calculation based on the load and the engine speed, or from at least one first characteristics map stored in a first memory of the electronic control device; and determining, using the electronic control device, the instantaneous temperature of the catalytic converter by calculation based on a catalytic converter starting temperature value stored in the electronic control device, the detected engine speed, the determined exhaust-gas temperature and at least one of the detected coolant temperature, the detected outside air temperature, the detected load, and the determined exhaust-gas flow rate, or from at least one second characteristics map stored in a second memory of the electronic control device.

2. The method as recited in claim 1 further comprising:

determining, after the engine has been switched off, the catalytic converter starting temperature value by continuing the determining of the instantaneous temperature of the catalytic converter until the determined instantaneous temperature of catalytic converter corresponds approximately to the detected outside air temperature; and storing, in the electronic control device, the determined catalytic converter starting temperature value as a new catalytic converter starting temperature value.

3. The method as recited in claim 1 wherein the detecting the load is performed using a sensor for sensing the opening-angle of a throttle valve in the intake port.

4. The method as recited in claim 1 wherein the detecting the load is performed using a position sensor for sensing the position of a gas pedal.

* * * * *